United States Patent
Uehara

(10) Patent No.: US 10,142,506 B2
(45) Date of Patent: Nov. 27, 2018

(54) INFORMATION PROCESSING APPARATUS AND INFORMATION PROCESSING METHOD

(71) Applicant: Noriyuki Uehara, Kanagawa (JP)

(72) Inventor: Noriyuki Uehara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/633,904

(22) Filed: Jun. 27, 2017

(65) Prior Publication Data

US 2018/0013911 A1  Jan. 11, 2018

(30) Foreign Application Priority Data

Jul. 7, 2016 (JP) ................. 2016-135459

(51) Int. Cl.
  *G06F 3/12* (2006.01)
  *H04N 1/00* (2006.01)
  *H04N 1/32* (2006.01)

(52) U.S. Cl.
  CPC ..... *H04N 1/00928* (2013.01); *H04N 1/32122* (2013.01); *H04N 1/32507* (2013.01); *H04N 2201/0094* (2013.01); *H04N 2201/326* (2013.01); *H04N 2201/3276* (2013.01)

(58) Field of Classification Search
  None
  See application file for complete search history.

(56) References Cited

U.S. PATENT DOCUMENTS

2009/0322948 A1* 12/2009 Funabiki .................. G06F 3/14
                                                          348/571
2017/0006413 A1*  1/2017 Kizawa ............. G06F 17/30905

FOREIGN PATENT DOCUMENTS

| JP | 2011-041146 | 2/2011 |
| JP | 2012-147356 | 8/2012 |
| JP | 2013-025426 | 2/2013 |
| JP | 2013-243762 | 12/2013 |
| JP | 2014-153548 | 8/2014 |

\* cited by examiner

*Primary Examiner* — Moustapha Diaby
(74) *Attorney, Agent, or Firm* — Harness, Dickey & Pierce, P.L.C.

(57) ABSTRACT

An information processing apparatus includes a storage device, a generating circuit, and an initialization circuit. The storage device stores control device configuration information in relation to resolution information of a control device. The control device configuration information is included in list information that is a list of information on the control device. The generating circuit generates dummy list information that is a dummy of the list information using the control device configuration information. The initialization circuit initializes the control device based on the dummy list information.

12 Claims, 6 Drawing Sheets

FIG. 6

| Byte | Function Described |
|---|---|
| 00 | Header |
| 01 | |
| 02 | |
| 03 | |
| 04 | |
| 05 | |
| 06 | |
| 07 | |
| 08 | Manufacturer's Code name |
| 09 | |
| 0A | ID Product_Code |
| 0B | |
| 0C | ID Serial Number |
| 0D | |
| 0E | |
| 0F | |
| 10 | Week of Manufacture |
| 11 | Year of Manufacture |
| 12 | EDID Version Number |
| 13 | EDID Revision Number |
| 14 | Video Input Definition |
| 15 | Max Hor. Image Size |
| 16 | Max Ver. Image Size |
| 17 | Display Gamma |
| 18 | Feature Support Byte |
| 19 | Display x/y Chromaticity Coordinates |
| 1A | |
| 1B | |
| 1C | |
| 1D | |
| 1E | |
| 1F | |
| 20 | |
| 21 | |
| 22 | |
| 23 | Supported Established Timing 1 |
| 24 | Supported Established Timing 2 |
| 25 | Supported Manufacture's Timings |
| 26 | Standard Timings |
| 27 | |
| 28 | |
| 29 | |

| Byte | Function Described |
|---|---|
| 2A | |
| 2B | |
| 2C | |
| 2D | |
| 2E | |
| 2F | |
| 30 | |
| 31 | |
| 32 | |
| 33 | |
| 34 | |
| 35 | |
| 36 | Pixel Clock |
| 37 | |
| 38 | Horizontal Addressable Video |
| 39 | |
| 3A | |
| 3B | Vertical Addressable Video |
| 3C | |
| 3D | |
| 3E | Horizontal Front Porch |
| 3F | Horizontal Sync Pulse Width |
| 40 | Vertical Front Porch |
| 41 | Vertical Sync Pulse Width |
| 42 | Horizontal Adressable Image Size |
| 43 | |
| 44 | |
| 45 | Horizontal Border Size |
| 46 | Vertical Border Size |
| 47 | Detail Timing Definition |
| 48 | Display Descriptor Definitions 18 byte |
| 49 | |
| 4A | |
| 4B | |
| 4C | |
| 4D | |
| 4E | |
| 4F | |
| 50 | |
| 51 | |
| 52 | |
| 53 | |
| 54 | |

| Byte | Function Described |
|---|---|
| 55 | |
| 56 | |
| 57 | |
| 58 | |
| 59 | |
| 5A | Display Descriptor Definitions 18 byte |
| 5B | |
| 5C | |
| 5D | |
| 5E | |
| 5F | |
| 60 | |
| 61 | |
| 62 | |
| 63 | |
| 64 | |
| 65 | |
| 66 | Reserved |
| 67 | Reserved |
| 68 | Reserved |
| 69 | Reserved |
| 6A | Reserved |
| 6B | Reserved |
| 6C | Display Descriptor Definitions 18 byte |
| 6D | |
| 6E | |
| 6F | |
| 70 | |
| 71 | |
| 72 | |
| 73 | |
| 74 | |
| 75 | |
| 76 | |
| 77 | |
| 78 | |
| 79 | |
| 7A | |
| 7B | |
| 7C | |
| 7D | |
| 7E | Extention Flag |
| 7F | CheckSUM |

INFORMATION PROCESSING APPARATUS AND INFORMATION PROCESSING METHOD

CROSS-REFERENCE TO RELATED APPLICATION

This patent application is based on and claims priority pursuant to 35 U.S.C. § 119(a) to Japanese Patent Application No. 2016-135459, filed on Jul. 7, 2016, in the Japan Patent Office, the entire disclosure of which is hereby incorporated by reference herein.

BACKGROUND

Technical Field

The present embodiments relate to an information processing apparatus and an information processing method.

Related Art

Display Data Channel (DDC) is a set of communication protocols implemented by Video Electronics Standards Association (VESA). DDC is a bidirectional serial communication protocol that uses three lines, a data signal line, a clock signal line, and a ground line (ground), to enable a display device to communicate device ID information, such as model number and resolution, to the video card of a connected personal computer (PC). The format of the transferred data is Extended. Display Identification Data (EDID). Using EDID, the PC can automatically turn on and switch the resolution of a display device connected to the PC, and automatically limit its resolution.

Additionally, a multifunction peripheral (MFP) equipped with a detachable control device is known, in which a display device is provided to control device side and the EDID is stored on the control device side. The MFP acquires the resolution and display size of the display device based on the EDID obtained by communicating with the control device when first starting up or when waking up from a power-saving mode, and initializes settings suitable to the display device.

SUMMARY

An improved information processing apparatus includes a storage device, a generating circuit, and an initialization circuit. The storage device stores control device configuration information in relation to resolution information of a control device. The control device configuration information is included in a list of information on the control device. The generating circuit generates a dummy of the list information using the control device configuration information. The initialization circuit initializes the control device based on the dummy list information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein;

FIG. 6 is an illustration of an example format of the EDID;

DETAILED DESCRIPTION

Figure 1:
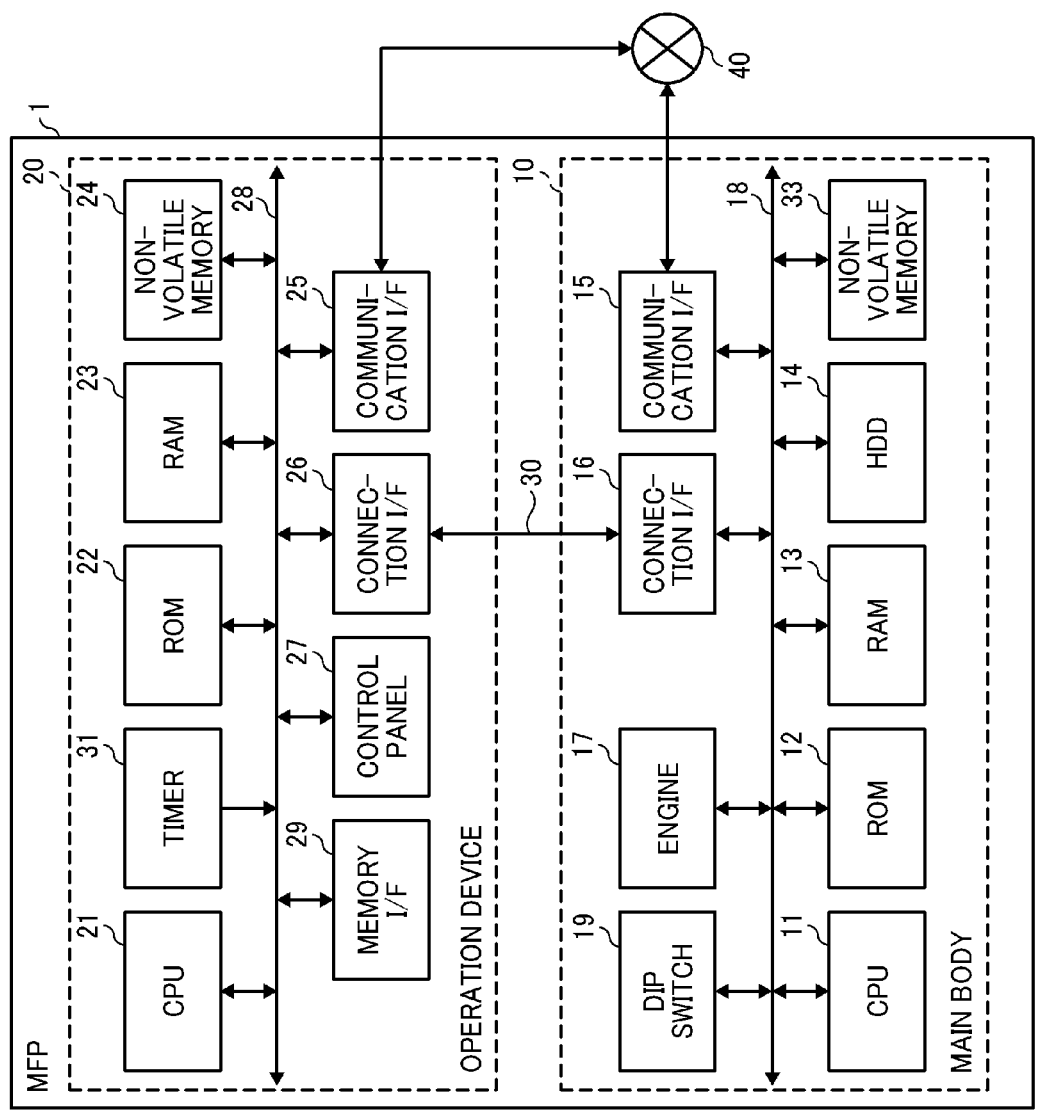
FIG. 1 is a schematic block diagram illustrating a hardware configuration of a multifunction peripheral (MFP) according to embodiments of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

A multifunction peripheral 1 (MFP) according to embodiments of the present disclosure is described with reference to the drawings.

Hardware Configuration of MFP

FIG. 1 is a schematic block diagram illustrating a hardware configuration of the MFP 1 according to one of the embodiments. The MFP 1 according to the embodiment includes a main body 10 that has various types of functions such as a copy function, a scan function, a facsimile communication function, and a print function, and a control device 20 that accepts an input from a user for operation. Alternatively, the main body 10 may include one or more image forming functions including the copy function, the scan function, the facsimile communication function, and the print function.

The main body 10 and the control device 20 are communicably connected with each other via a dedicated communication path 30. In the embodiment, the communication path 30 may be universal serial bus (USB) standard-compliant. However, any arbitrary standard, whether wired or wireless, may be used as the communication path 30.

As the control device 20, an electronic device that can process information on its own may be used. As examples of the control device 20, an information processing terminal device such as a smart phone and a tablet type terminal may be used. Such an information processing terminal device used as the control device 20 functions as an operator of the MFP 1.

A control panel fixed to the main body 10 as an operator dedicated to the MEP 1 may be regarded as the control device 20, however the MFP 1 according to the present embodiment is detachably connected to the main body 10. The control device 20 establishes wireless communication, such as Bluetooth (registered trademark) and infrared communication, with the main body 10 and serves as an operator of the MFP 1 when detached from the main body 10.

The main body 10 operates according to the input accepted with the control device 20. The main body 10 is also capable of communicating with an external device such as a client personal computer (PC) and operating in response to an instruction received from the external device.

Hardware Configuration of Main Body

A hardware configuration of the main body 10 is described below.

Referring to FIG. 1, the main body 10 includes a central processing unit (CPU) 11, a read only memory (ROM) 12, a random access memory (RAM) 13, and a hard disc drive (HDD) 14. The main body 10 also includes a communication interface (1/F) 15, a connection I/F 16, an engine 17, a dual in-line package (DIP) switch 19, and a non-volatile memory 33. The above-mentioned elements 11 to 17, the DIP switch 19, and the non-volatile memory 33 are connected to each other through a system bus 18.

The CPU 11 is one example of a memory control and controls the main body 10. The CPU 11 controls the main body 10 by executing programs stored in the RUM 12 or the HDD 14, etc., using the RAM 13 as a work area, to implement various functions such as the copy function, the scan function, the facsimile communication function and a print function as described above.

Additionally, the CPU 11 initializes the control device 20, which is connected with a wired line or wirelessly, by executing a start-up processing program stored in a storage unit, such as ROM 12, RAM 13, HDD 14, or the non-volatile memory 33.

The communication LP 15 communicates with, for example, a personal computer device and a server device via a network 40 such as a local area network (LAN) and the Internet. The connection I/F 16 is an interface for allowing the main body 10 to communicate with the control device 20 via the communication path 30. In FIG. 1, the communication path 30 is indicated by an actual line, however, the control device 20 is detachable to the main body 10 of the MFP 1. When the control device 20 is physically connected to the MFP 1, the communication path 30 establishes wired communication. Otherwise, when the control device 20 is detached from the main body 10, the communication path 30 establishes wireless communication.

The engine 17 is a hardware device that enables to implement the copy function, the scan function, the facsimile communication function, and the print function, but not performs general processing including information processing and communication processing. The engine 17 includes, for example, a scanner (image reading device) that scans and reads an image of a document, a plotter (image forming device) that prints the image on sheet member such as a sheet of paper, and facsimile communication device that carries out facsimile communication. The engine 17 also may include optional devices, such as a finisher that sorts printed sheets and an automatic document feeding device (ADF) that automatically feeds the document, and thus provide specific options.

The DIP switch 19 is one example of a selection device (selector), and indicates a control device selected from a plurality of control devices if there are the plurality of control devices, as one currently communicating with the main body 10. The DIP switch 19 is implemented with software or hardware and controlled by a user. For example, when there are a control device A and a control device B, the user sets the DIP switch 19 to select the control device A when the control device A is used to communicate with the main body 10. On contrary, the user sets the DIP switch 19 to select the control device 13 when the control device B is used to communicate with the main body 10.

Hardware Configuration of Control Device

A hardware configuration of the control device 20 is described below.

Referring to FIG. 1, the control device 20 includes a CPU 21, a ROM 22, a RAM 23, a non-volatile memory 24, a communication I/F 25, a connection I/F 26, a control panel 27, a memory I/F 29, and a timer 31, which are connected with one another via a system bus 28.

The CPU 21 integrally controls the control device 20. More specifically, the CPU 21 executes a program stored in, for example, the ROM 22 using the RAM 23 as a work area to control the control device 20 entirely. The communication LT 25 communicates with the personal computer device and the server device via the network 40 such as a LAN and the Internet. The connection I/F 26 is an interface for allowing the control device 20 to communicate with the main body 10 via the communication path 30. The memory I/F 29 can detachably accept an external memory and write and read information to and from the external memory.

The control panel 27 is configured with a liquid crystal display (LCD) device having a touch sensor. The control panel 27 accepts various types of user inputs, and displays various types of information that include, for example, information generated in response to the accepted input and information indicating an operating state of the MFP 1. Alternatively, the control panel 27 may be configured with an organic electro luminescence (EL) display device having a touch sensor. Additionally, the control panel 27 may include an operation unit such as a hardware key and a display unit such as a light emitter. The timer 31 keeps time.

Here, in the MFP 1 of the embodiment, for example, an operating system (OS) of the main body 10 is different from an OS of the control device 20. As one example of the OS, Linux (registered trademark) may be used for the main body 10 and Android (registered trademark) may be used for the control device 20.

The main body 10 and the control device 20 operate individually using the different OS, so that communication between the main body 10 and the control device 20 is regarded as communication between separate devices, but not inter-process communication within a common apparatus. Examples of the communication between the main body 10 and the control device 20 may include transmitting the input (e.g., instruction contents) received by the control device 20 to the main body 10, which is referred to as command communication, notifying the control device 20 of an event by the main body 10. In the embodiment, the command communication from the control device 20 to the main body 10 activates the functions of the main body 10 to be used. Examples of the events notified from the main body 10 to the control device 20 may include an operational state in the main body 10 and contents of settings in the main body 10.

In the embodiment, power is supplied from the main body 10 to the control device 20 via the communication path 30, so that the power control of the control device 20 may be performed separately (independently) from the power control of the main body 10.

The main body 10 and the control device 20 are electrically and physically connected with each other via the communication path 30, but the control device 20 can be removed from the main body 10 as described above. When the control device 20 is detached from the main body 10, a near-distance wireless communication unit, such as an infrared communication unit, a radio frequency (RF) communication unit, and a Bluetooth (registered trademark) communication unit, provided in the main body 10 and the control device 20 may be used. Alternatively, the main body 10 and the control device 20 may communicate with each other through wireless LAN communication, such as Wi-Fi (registered trademark). When the control device 20 is removable from the main body 10, the control device 20 charges a secondary battery with the power supplied from the main body 10 through the communication path 30, and communicates with the main body 10 using the power charged in the secondary battery when detached from the main body 10.

Software Configuration of MFP

Figure 2:
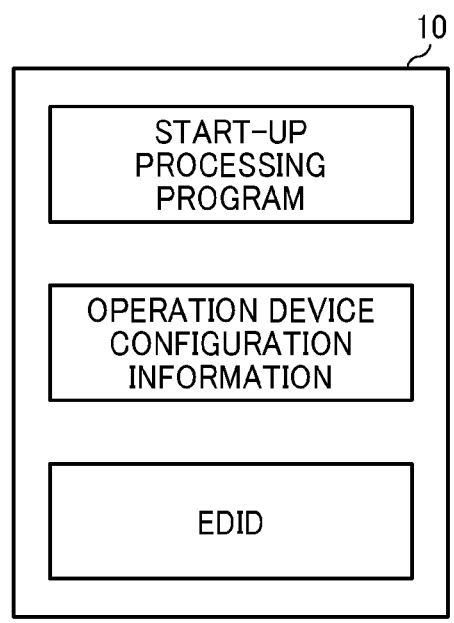
FIG. 2 is a schematic block diagram illustrating a software configuration of the MFP according to embodiments of the present disclosure.

FIG. 2 is a schematic block diagram illustrating a software configuration of the main body 10 of the MFP 1 according to the embodiment. As described in FIG. 2, the main body 10 stores a start-up processing program, control device configuration information, and extended display identification data (EDID). The EDID is a list of information on the control device 20. The start-up processing program is a program that causes the control device 20 to be in an operating state based on the EDID, when the MFP 1 starts up or returns (recovers) from a power-saving mode or a sleep mode. The control device configuration information is set based on a specification of the control device 20 including resolution and a display size indicated with the EDID. The EDID is information indicating the specification of the control device 20 that includes the resolution and the display size. In the MFP 1 according to the embodiment, for example, the HDD 14 of the main body 10 stores the start-up processing program and the control device configuration information, however such a program and information may be stored any storage units. The EDID is stored in the non-volatile memory 33 of the main body 10.

Considering a general combination of a personal computer device and a monitor device, a personal computer device side does not know what kinds of monitor devices are to be connected to the personal computer device. Accordingly, a source device, the personal computer device, communicates with a sink device, the monitor device, being connected to the source device in starting up of the source device, to acquire the EDID to initialize the sink device each time. The EDID is uniquely and individually assigned to each sink device.

Regarding the MFP 1, only a specific sink device, which is the control device 20 described above, is connected, and the MFP 1 is not necessary to obtain information on the sink device with each start-up. The main body 10, which is a source device, already has the specification including the resolution and the display size of the control device 20 connected to the main body 10. The main body 10, accordingly, can have the information of EDID corresponding to the specification including the resolution and the display size of the control device 20 connected to the main body 10 in advance.

Figure 3:
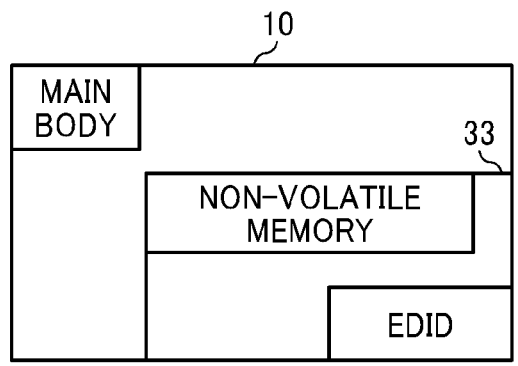
FIG. 3 is a schematic illustration of extended display identification data (EDID) stored in a main body of the MFP according to embodiments of the present disclosure.

The MFP 1 according to the embodiment has the EDID for the control device 20, which is generally stored in the control device 20, by storing the EDID in the non-volatile memory 33 of the main body 10 as shown in FIG. 3. The CPU 11 of the main body 10 reads the EDID of the control device 20 from the non-volatile memory 33 such as a flash memory provided in the main body 10 to initialize the control device 20 when the MFP 1 starts up or wakes up from the power-saving mode or the sleep mode, by executing the start-up processing program, which is described later. This reduces the time needed to obtain the EDID of the control device 20 from the control device by the main body 10 communicating with the control device 20. This also allows the control device 20 to eliminate a need to include a storage unit to store the EDID, resulting in reduction of manufacturing cost of the control device 20.

Functional Configuration of Main Body of MFP

Figure 4:
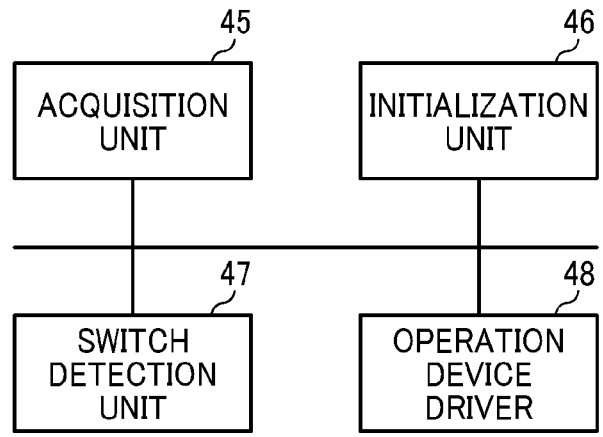
FIG. 4 is a schematic block diagram illustrating functions of the MFP according to embodiments of the present disclosure.

FIG. 4 is a schematic block diagram illustrating functions implemented by executing the start-up processing program by the CPU 11 of the main body 10 of the MFP 1 according to the embodiment. As described in FIG. 4, the CPU 11 implements each function of an acquisition unit 45, an initialization unit 46, a switch detection unit 47, and a control device driver 48 by executing the start-up processing program. The acquisition unit 45 acquires the EDID of the control device 20, which is stored in the non-volatile memory 33 of the main body 10 when the MFP 1 starts up or wakes up from the power-saving mode or the sleep mode, which are a suspended state, to a normal mode, which is an operating state. The initialization unit 46 initializes the control device 20 based on the acquired EDID by setting the information of the control device 20 including the resolution and operation frequency to the control device driver 48. The switch detection unit 47 detects the control device 20 selected from the plurality of control devices 20 with the DIP switch 19. The control device driver 48 causes the control device 20 to drive for displaying based on the resolution and the operation frequency set by the initialization unit 46.

Here, as one example, the components, the acquisition unit 45 to the switch detection unit 47, are described as software implemented by executing the start-up processing program. However, the embodiment is not limited to this, but a part of or all of the components of the acquisition unit 45 to the switch detection unit 47 may be configured as hardware such as integrated circuits (ICs).

Alternatively, the start-up processing program may be stored in a computer-readable recording medium, such as a compact disc read only memory (CD-ROM) and a flexible disk (FD), in an installable or executable file format. Alternatively, the start-up processing program may be provided as a computer-readable recording medium such as a compact disc recordable (CD-R), a digital versatile disk (DVD), a Blue-ray disk (registered trademark), and a semiconductor memory, storing the start-up processing program. Alternatively, the start-up processing program may be provided by being installed via a network such as the Internet. Furthermore, the start-up processing program may be provided by being implemented in, for example, a ROM in a device in advance.

Initialization Operation

Figure 5:
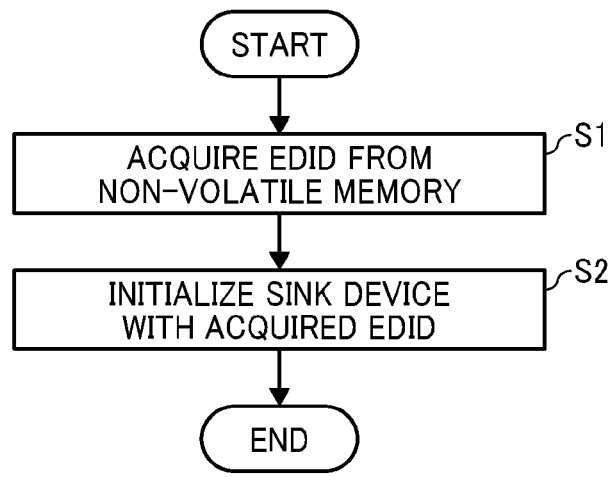
FIG. 5 is a flowchart illustrating a process of initializing the MFP according to embodiments of the present disclosure.

FIG. 5 is a flowchart illustrating a process of initialization performed by the MFP 1 according to the one of embodiments. The process illustrated with the flowchart of FIG. 5 starts from S1 when the MFP 1 is powered on by turning on a main power source, when the MFP 1 returns from the power-saving mode, in which the MEP 1 stops power supply to a predetermined section of the MFP 1 to reduce energy consumption, or when the MFP 1 returns from the sleep mode, in which the MFP 1 stops the power supply to more than the predetermined section to further reduce the energy consumption. In S1, the acquisition unit 45 of the main body 10 acquires the EDID of the control device 20, which is stored in the non-volatile memory 33 of the main body 10.

Format of EDID

FIG. 6 is an illustration of an example format of the EDID. The EDID is, for example, 128 bytes of data as total, and includes header information stored in 0*00th byte as illustrated in FIG. 6. The EDID includes a manufacture's code name, an identification (ID) code name, and an ID serial number, stored in 0*08th byte, 0*0Ath byte, and 0*0Cth byte, respectively. The EDID also includes week information of manufacture, year information of manufacture, a EDID version number, and an EDID revision number stored in 0*10th byte, 0*11th byte, 0*12th byte, and 0*13th byte, respectively.

Additionally, the EDID includes a maximum horizontal image size, a maximum vertical image size, a gamma value, a chromaticity coordinates, as a video image input definition, stored in 0*14th byte to 0*19 byte. 0*18th byte is a storage area for storing a value defined in the future. Additionally, a first supported video image frequency, a second supported video image frequency, a supported manual set video image frequency, and a standard video image frequency are stored in 0*3th byte, 0*24th byte, 0*25th byte, and 0*26th byte, respectively.

The EDID has a storage area from 0*36th byte to 0*47th byte, the total 18 byte of data, to store the control device configuration information in association with the control device 20. More specifically, 0*36th byte has a pixel clock frequency that is an updated frequency of a pixel, 0*38th byte has a horizontal addressable video image, 0*313th byte has a vertical addressable video image, 0*3Eth byte has a front porch of a horizontal synchronization signal, and 0*3Fth byte has a pulse width of a horizontal synchronization signal.

Additionally, 0*40th byte has a front porch of a vertical synchronization signal, 0*41th byte has a pulsed width of a vertical synchronization pulse of the vertical synchronization signal, and 0*42th byte has a horizontal addressable video image size. 0*45th byte has a horizontal border size of the video image, 0*46th byte has a vertical border size, and 0*47th byte has a refresh rate of the image.

In addition to that, 0*48th byte to 0*7Dth byte are areas of descriptor definitions of the control panel 27 and reserved areas, 0*7Eth byte has an extension flag, and 0*7Fth byte has a checksum for error correction processing.

In S2, the initialization unit 46 performs initialization by setting the information including the frequency and the resolution of the control device 20 connected to the main body 10 to the control device driver 48 of the start-up processing program based on the EDID. In other words, the initialization unit 46 initializes by updating the information set to the control device driver 48 according to the control device 20. The information set to the control device driver 48 is stored in a storage unit such as the RAM 13. The initialization unit 46, accordingly, rewrites the RAM 13 with the information including the frequency and the resolution of the corresponding control device 20 currently connected to the main body 10. Through this, the control device driver 48 is set with the information including the frequency and the resolution of the corresponding control device 20 currently connected to the main body 10 and the initialization is performed. After the initialization is completed, the process illustrated with the flowchart of FIG. 5 is completed.

In Case of a Plurality of Control Devices

Figure 7:
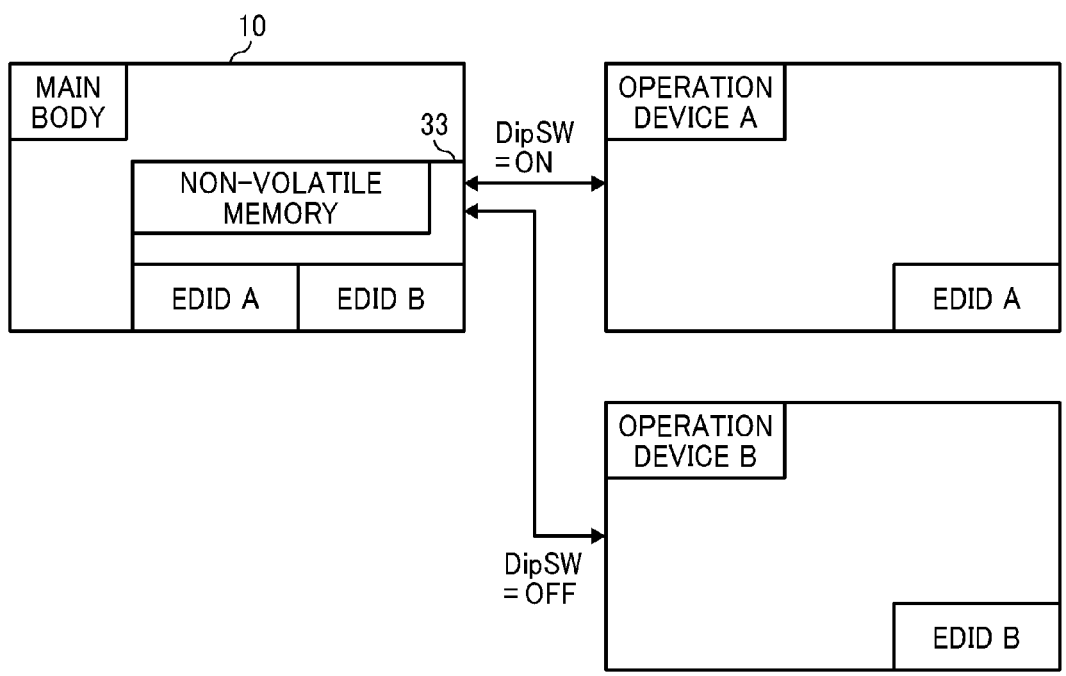
FIG. 7 is a diagram illustration of operation of selecting one of a plurality of control devices with a dual in-line package (DIP) switch.

FIG. 7 illustrates an exemplary case where there are the plurality of control devices 20, for example, a control device A and a control device B for the main body 10. In this case, the non-volatile memory 33 of the main body 10 stores EDID-A that is the EDID of the control device A and EDID-B that is the EDID of the control device B. The user operates the DIP switch 19 illustrated in FIG. 1, which is implemented by the software or the hardware, to select the control device 20 that is currently used. The acquisition unit 45 acquires the EDID-A, which is the EDID of the control device A, from the non-volatile memory 33 when the DIP switch 19 selects the control device A, and the initialization unit 46 performs the initialization processing using the EDID-A. The acquisition unit 45 acquires the EDID-B, which is the EDID of the control device B, from the non-volatile memory 33 when the DIP switch 19 selects the control device B, and the initialization unit 46 performs the initialization processing using the EDID-B.

Initialization Operation in Case of a Plurality of Control Devices

Figure 8:
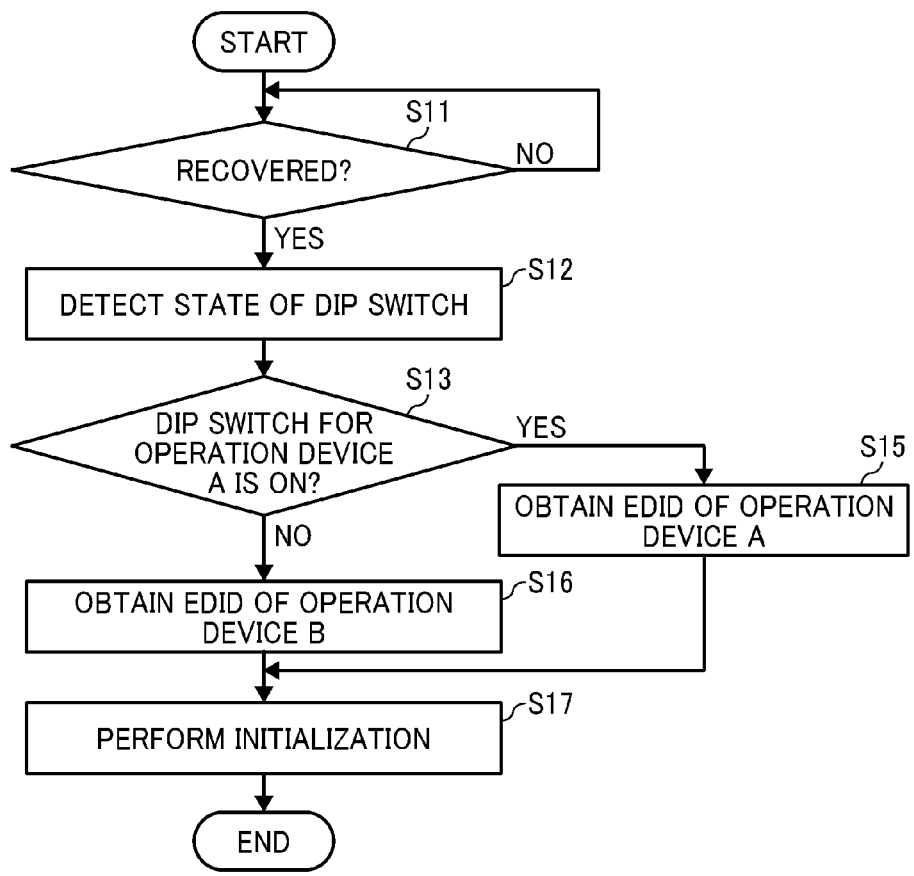
FIG. 8 is a flowchart illustrating a process of initializing one of the plurality of control devices selected with the DIP switch.

FIG. 8 is a flowchart illustrating a process of initialization in a case where the plurality of control devices 20 including the control device A and the control device B are selectively used. In S11, the switch detection unit 47 detects whether the main body 10 starts up or returns from the power-saving mode. If detecting the start up or returning (S11: Yes), the switch detection unit 47 detects a state of the DIP switch 19 in S12. The switch detection unit 47, then determines whether the state indicates the control device A is to be selected, namely the DIP switch 19 is ON in relation to the control device A in S13. If the state of the DIP switch 19 indicates that the control device A is to be selected, the acquisition unit 45 acquire the EDID-A, which is the EDID of the control device A, from the non-volatile memory 33 in S15. The initialization unit 46 performs the initialization using the EDID-A in S17, and the process illustrated with the flowchart of FIG. 8 is completed.

On the other hand, when the switch detection unit 47 determines the state does not indicate that the control device A is to be selected (S13: No), the acquisition unit 45 acquires the EDID-B, which is the EDID of the control device B from the non-volatile memory 33 in S16. Subsequently, the initialization unit 46 performs the initialization using the EDID-B in S17, and the process illustrated with the flowchart of FIG. 8 is completed.

Initialization Operation in Waking Up

Figure 9:
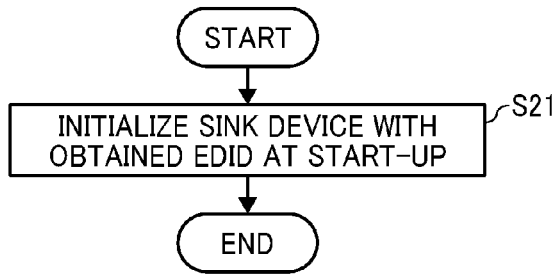
FIG. 9 is a flowchart illustrating a process of initialization in waking up from a power-saving mode or a sleeping mode using the EDID previously used in starting up.

FIG. 9 is a flowchart illustrating initialization in waking up from the power-saving mode or sleep mode. As illustrated in the flowchart of FIG. 9, when waking up from the power-saving mode or the sleep mode, the initialization unit 46 performs the initialization using the EDID that is previously acquired in starting up. In the MEP 1 according to the embodiment, the EDID is stored in the RAM 13, which is one of examples of a temporary storage unit that can read at high speed. The initialization unit 46 performs initialization using the EDID previously acquired and stored in the RAM 13, but not stored in the nonvolatile memory 33. This can further shorten a time to acquire the EDID, and the MFP 1 can reduce time to be ready for operating.

Generating Dummy EDID

The EDID has, for example, 128 bytes as total, as described with FIG. 6. Accordingly, when the non-volatile memory 33 stores the EDID as it is, 128 byte of storage area is occupied with the EDID. However, the control device configuration information required for setting the control device 20 is totally 18 byte that is 0*36th byte to 0*47th byte of the 128 byte of the EDID. Accordingly, in the MFP 1 according to the embodiment, the control device configuration information of 18 byte, which is 0*36th byte to 0*47th byte, is stored in the non-volatile memory 33. This frees a part of the storage area "EDID 128 byte-control device configuration information 18 byte 110 byte" in the non-volatile memory 33.

The control device configuration information of 18 byte as the total is stored in the non-volatile memory 33 without any problem, however if 110 byte that is the remaining space is filled with data "0", the data hardly functions as the EDID. Accordingly, the acquisition unit 45 generates dummy EDID in which the control device configuration information is described in EDID that is previously used for operation, such as the EDID-A of the control device A described above, after reading the control device configuration information that is 18 byte from the non-volatile memory 33. The initialization unit 46 performs initialization using the dummy EDID.

When there are the plurality of control devices 20 including the control device A and the control device B, the non-volatile memory 33 stores the control device configuration information for the control device A and the control device configuration information for the control device B. The acquisition unit 45 acquires the control device configuration information for one of the control devices indicated by the DIP switch 19 from the non-volatile memory 33. The acquisition unit 45, which is one example of a generating unit, generates the dummy EDID in which the acquired control device configuration information described, and the initialization unit 46 performs the initialization of the one of the control devices indicated by the DIP switch 19 using the generated dummy EDID.

Additionally, the non-volatile memory 33 has the storage capacity to read the EDID at high speed, the above-mentioned dummy EDID may be stored in the non-volatile memory 33. Additionally, the acquisition unit 45 may be provided with hardware that generates the dummy EDID, though the dummy data is described as being generated by software in the description of the embodiment.

As described above, the MFP 1 according to the embodiment stores the EDID for the control device 20 in the non-volatile memory 33 of the main body 10. The MFP 1 performs the initialization by reading the EDID from the non-volatile memory 33 in starting up and waking up from the power-saving mode or the sleeping mode. This allows the main body 10 to eliminate a need to communicate with the control device 20 to obtain the EDID, and shortens the time of the MFP 1 to be ready for the operation. Additionally, the control device 20 does not have to be provided with a storage to store the EDID and the control device 20 can have a simple configuration, resulting in reducing cost for manufacturing.

In addition, the non-volatile memory 33 stores pieces of EDID of each of the plurality of control devices, and the DIP switch 19 selects the control device 20 that is currently used. The EDID of the control device 20 selected with the DIP switch 19 is read from the non-volatile memory 33 to be used for the initialization. Through this, the MFP 1 can perform the initialization corresponding to the control device 20 that is currently used immediately even when there are the plurality of control devices 20.

Additionally, the control device configuration information for the control device 20 is stored in the non-volatile memory 33, and the acquisition unit 45 generates the dummy EDID, which can function as the EDID, using the control device configuration information. This allows the non-volatile memory 33 to store necessary control device configuration information for generating the dummy EDID, so that the nonvolatile memory 33 can free a large amount of the storage space of the non-volatile memory 33, compared to the case where the EDID is stored in the non-volatile memory 33.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the exemplary embodiments of the disclosure have been described and illustrated above, such description is not intended that the disclosure be limited to the illustrated embodiments. Numerous additional modifications and variations are possible in light of the above teachings. For example, in the exemplary embodiment described above the disclosure is applied to the MFP 1 in which the main body 10 and the control device 20 operates independently. However, the disclosure may be applied to any apparatus in which one device performs initialization by acquiring EDID for the other device. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing apparatus, comprising:
a control device that receives an operation instruction according to user input; and
a main body that operates according to a request transmitted from the control device, wherein
the main body includes a non-volatile memory and circuitry, the non-volatile memory stores control device configuration information that is related to at least resolution information of the control device, of list information that is a list of a plurality of items of control device information, when a power supply of the main body is off;
the circuitry controls the control device and performs processing for initialization of the control device according to the control device configuration information, when the power supply of the main body transitions from an OFF state to an ON state,
wherein a memory in the main body of the information processing apparatus, to store control device configuration information corresponding to only a portion of an extended display identification data (EDID), the portion being information that provides resolution information of the control device of the information processing apparatus needed for initialization, the control device configuration information being obtained from the EDID as list information that is the list of a plurality of items of control device information regarding a specification of the control device;
the circuitry in the main body generates dummy list information that is a dummy of the list information using the control device configuration information, and initializes the control device based on the dummy list information, wherein the circuitry performs the initialization of the control device by setting at least resolution and operation frequency to the control device.

2. The information processing apparatus of claim 1, wherein the circuitry generates dummy list information that is substantially the same as the list information using the control device configuration information, the circuitry performs processing for the initialization of the control device according to the dummy list information, the control device includes a storage control unit to cause a temporary storage unit to store the dummy list information to be read at high speed, and wherein, when the information processing apparatus returns to an operating state from a suspended state, the circuitry acquires the dummy list information from the temporary storage unit to perform processing for the initialization of the control device.

3. The information processing apparatus of claim 1, wherein the main body includes a selector, and the circuitry performs processing for initialization of the control device according to the control device configuration information.

4. The information processing apparatus of claim 3, wherein the circuitry acquires the control device configuration information of the control device selected with the selector and generates the dummy list information.

5. The information processing apparatus of claim 1, wherein the circuitry generates dummy list information that is substantially the same as the list information using the control device configuration information, the circuitry performs processing for the initialization of the control device according to the dummy list information, and the control device includes a storage control unit to store the generated dummy list information in the non-volatile memory instead of the control device configuration information.

6. The information processing apparatus of claim 1, wherein the information processing apparatus is a multi-function printer.

7. The information processing apparatus of claim 1, wherein the main body includes a scanner, plotter and automatic document feeder.

8. The information processing apparatus of claim 1, wherein the main body further includes a controller to control the control device.

9. The information processing apparatus of claim 1, wherein the control device includes a first operating system, and the main body includes a second operating system that operates independently of the first operating system.

10. The information processing apparatus of claim 1, wherein the non-volatile memory stores control device configuration information that is related to at least the resolution information and a display size of the control device, of the list information, when the power supply of the main body is off.

11. A method of processing information, comprising:

receiving an operation instruction at a control device of an information processing apparatus according to user input;

operating a main body of the information processing apparatus according to a request transmitted from the control device;

storing control device configuration information that is related to at least resolution information of a control device, of information that is a list of a plurality of items of control device information, when a power supply of the main body is off;

initializing the control device according to the control device configuration information when the power supply of the main body transitions from an OFF state to an ON, wherein a memory in the main body of the information processing apparatus, to store control device configuration information corresponding to only a portion of an extended display identification data (EDID), the portion being information that provides resolution information of the control device of the information processing apparatus needed for initialization, the control device configuration information being obtained from the EDID as list information that is the list of a plurality of items of control device information regarding a specification of the control device;

generating dummy list information that is a dummy of the list information using the control device configuration information, and initializing the control device based on the dummy list information, wherein the initialization of the control device is performed by setting at least resolution and operation frequency to the control device.

12. A non-transitory recording medium storing a plurality of instructions which, when executed by one or more processors, cause the processors to perform an information processing method comprising:

receiving an operation instruction at a control device of an information processing apparatus according to user input;

operating a main body of the information processing apparatus according to a request transmitted from the control device;

storing control device configuration information that is related to at least resolution information of a control device, of list information that is a list of a plurality of items of control device information, when a power supply of the main body is off;

initializing the control device according to the control device configuration information, when the power supply of the main body transitions from an OFF state to an ON, wherein a memory in the main body of the information processing apparatus, to store control device configuration information corresponding to only a portion of an extended display identification data (EDID), the portion being information that provides resolution information of the control device of the information processing apparatus needed for initialization, the control device configuration information being obtained from the EDID as list information that is the list of a plurality of items of control device information regarding a specification of the control device;

generating dummy list information that is a dummy of the list information using the control device configuration information, and initializing the control device based on the dummy list information, wherein the initialization of the control device is performed by setting at least resolution and operation frequency to the control device.

* * * * *